UNITED STATES PATENT OFFICE.

EDWARD CHARLES LUDWIG KRESSEL, OF LONDON, ENGLAND, ASSIGNOR OF TWO-THIRDS TO THOMAS HILL-JONES, OF LONDON, ENGLAND.

PROCESS OF PREPARING ALIMENTARY EXTRACTS.

SPECIFICATION forming part of Letters Patent No. 694,102, dated February 25, 1902.

Original application filed September 3, 1897, Serial No. 651,516. Divided and this application filed December 9, 1898. Serial No. 698,770. (No specimens.)

*To all whom it may concern:*

Be it known that I, EDWARD CHARLES LUDWIG KRESSEL, a subject of the Queen of Great Britain, residing at London, England, have invented a new and useful Manufacture of an Improved Alimentary Extract; and I do hereby declare that the following is a full, clear, and exact description of the invention, which will enable others skilled in the art to which it appertains to make and use the same.

This invention relates to the manufacture of an improved alimentary extract of great value as an article of food, and is covered in part by Letters Patent, granted to me in Great Britain, No. 15,885 of 1895, and in Germany, No. 89,819, dated March 17, 1896.

This application is a division of my former application filed September 3, 1897, and given Serial No. 651,516, upon which Letters Patent of the United States were granted to me September 24, 1901, No. 683,210.

In manufacturing the extract according to the present invention I take ordinary yeast, such as brewer's yeast, and wash the same, so as to remove the bitter taste therefrom—that is to say, I wash the yeast in water without the addition of any chemicals, as described in the specification of the said former patent. Other yeast than brewer's yeast may be employed, and in the case of distiller's yeast no washing is necessary.

The object of my invention is to hydrate the proteid matter contained in the protoplasm of the yeast-cells and to form peptones, and according to my present invention I do this by the action of superheated steam upon the yeast in the manner hereinafter appearing.

When I desire to hydrate the proteid matter contained in the protoplasm of the yeast-cells and to form peptones by the action of superheated steam upon the yeast, I proceed as follows: I wash the yeast and strain off the washing-water in the manner hereinbefore described. I then place the washed yeast into a digesting vessel or boiler, by preference closed and provided with a suitable safety-valve, and I pass into the vessel live steam at a temperature of from 180° to 200° centigrade. The steam is advantageously introduced into the vessel by means of a perforated coil, though other modes of introducing the steam may be adopted.

A vessel which I find suitable in practice for carrying out the process is shown in vertical section in the accompanying drawing.

In the said drawing, $a$ is the vessel or pan, and $b$ the coil, the lower part of which is perforated, as shown. The vessel $a$ is provided with the usual fittings, such as the safety-valve $c$, thermometer $d$, and gage $e$. $f$ is a manhole for filling the vessel $a$; $g$, discharge-pipe; $h$, manhole for cleaning-out purposes, and $i$ a pipe for the escape of any excess of steam.

The treatment with the steam is continued until all the proteids have been hydrated and converted into peptones, the process usually taking about one-half an hour; but analysis of samples taken from the vessel will enable the operator to ascertain when the hydration has been completed. After hydration has been completed the liquor is strained through a filter-press and condensed in a manner similar to that adopted when digestive agents or chemicals are employed.

Having now particularly described and ascertained the nature of my said invention and in what manner the same is to be performed, I declare that what I claim is—

1. The process of preparing an alimentary extract from yeast which consists in hydrating the proteid matter of the yeast by treating the yeast in a closed receptacle with superheated steam, to convert said proteid matter into soluble peptones, then removing the solid matter and condensing the liquid, containing said soluble peptones, substantially as described.

2. The process of preparing an alimentary extract from yeast which consists in hydrating all the proteid matter of the yeast by treating the yeast in a closed receptacle with steam at a temperature of from 180° to 200° centigrade, to convert the proteid matter into soluble peptones, then removing the solid matter and condensing the liquid containing the said soluble peptones, substantially as described.

EDWARD CHARLES LUDWIG KRESSEL.

Witnesses:
F. REID,
I. HITCHCOCK.